(12) United States Patent
Weissman et al.

(10) Patent No.: US 9,762,266 B2
(45) Date of Patent: Sep. 12, 2017

(54) SIGNAL CORRECTION FOR CARRIER AGGREGATION TRANSCEIVER

(71) Applicant: QUALCOMM Incorporated, San Diego, CA (US)

(72) Inventors: Haim Mendel Weissman, Haifa (IL); Ariel Yaakov Sagi, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/668,823

(22) Filed: Mar. 25, 2015

(65) Prior Publication Data

US 2016/0285484 A1    Sep. 29, 2016

(51) Int. Cl.
*H04B 17/00* (2015.01)
*H04B 1/04* (2006.01)

(52) U.S. Cl.
CPC ......... *H04B 1/0475* (2013.01); *H04B 1/0483* (2013.01); *H04B 2001/0425* (2013.01)

(58) Field of Classification Search
CPC ........................... H04B 1/0475; H04B 1/0483
USPC ................................. 455/114.1, 114.2, 115.1
See application file for complete search history.

(56) References Cited

U.S. PATENT DOCUMENTS

| | | | |
|---|---|---|---|
| 6,728,517 B2 * | 4/2004 | Sugar | H04B 1/005 455/272 |
| 7,340,265 B2 | 3/2008 | Husted et al. | |
| 7,706,769 B2 * | 4/2010 | Perkins | H03D 3/008 455/295 |
| 7,724,840 B2 * | 5/2010 | McCallister | H03F 1/3247 330/149 |
| 8,013,676 B2 | 9/2011 | Su et al. | |
| 8,326,239 B1 | 12/2012 | Peiris et al. | |
| 8,767,869 B2 | 7/2014 | Rimini et al. | |
| 8,817,925 B2 | 8/2014 | Husted et al. | |
| 8,885,763 B2 | 11/2014 | Ananthaswamy | |
| 8,917,792 B2 * | 12/2014 | Black | H04B 15/00 375/259 |
| 9,312,894 B2 * | 4/2016 | Yamanouchi | H04B 1/0475 |

(Continued)

FOREIGN PATENT DOCUMENTS

| | | |
|---|---|---|
| EP | 1102418 A1 | 5/2001 |
| WO | WO-2014136437 A1 | 9/2014 |

OTHER PUBLICATIONS

Yamanouchi, Wireless transmission device and wireless transmission method, WO2014136437 A1, Sep 12, 2014, pp. 1-42 (machine translated PDF file only).*

(Continued)

*Primary Examiner* — Sonny Trinh
(74) *Attorney, Agent, or Firm* — Paradice and Li LLP/Qualcomm

(57) ABSTRACT

A transceiver in a wireless device supporting carrier aggregation may include a correction module to generate a correction signal to attenuate intermodulation distortion associated with a first transmitted communication signal. In one embodiment, the correction signal may be added to the first transmitted communication signal (a victim signal) to reduce the intermodulation distortion caused by a second transmitted communication signal (an aggressor signal). The correction signal may be generated based on the aggressor signal. In another embodiment, the correction signal may equalize or pre-distort the first transmitted communication signal.

20 Claims, 12 Drawing Sheets

(56) References Cited

U.S. PATENT DOCUMENTS

| | | |
|---|---|---|
| 2011/0007839 A1 | 1/2011 | Tang et al. |
| 2012/0002768 A1 | 1/2012 | Morita et al. |
| 2014/0269857 A1 | 9/2014 | Rimini et al. |

OTHER PUBLICATIONS

International Search Report and Written Opinion—PCT/US2016/021628—ISA/EPO—Jun. 10, 2016.

\* cited by examiner

| Operating Mode | Mode Description | Input Source for Correction Sub-modules | Input Source for Analysis unit 601 | Feedback selector control signal 590 | Output selector control signal 591 |
|---|---|---|---|---|---|
| 1 | Intermodulation Cancellation Calibration | Digital transmit signal 575 | Digital feedback signal 589 | Selects Coupler 556 (modulated transmit signal 580) | Selects Mixer Unit 540 |
| 2 | Intermodulation Cancellation Operation | Digital transmit signal 575 | Digital receive signal 572 or Digital receive signal 576 | N/A | Selects Mixer Unit 540 |
| 3 | Intermodulation Cancellation Calibration | Digital transmit signal 571 | Digital feedback signal 589 | Selects Coupler 557 (modulated transmit signal 583) | Selects Mixer Unit 545 |
| 4 | Intermodulation Cancellation Operation | Digital transmit signal 571 | Digital receive signal 572 or Digital receive signal 576 | N/A | Selects Mixer Unit 545 |
| 5 | Equalization of digital transmit signal 571 | Digital transmit signal 575 | Digital feedback signal 589 | Selects Coupler 556 (modulated transmit signal 580) | Selects Mixer Unit 540 |
| 6 | Equalization of digital transmit signal 575 | Digital transmit signal 575 | Digital feedback signal 589 | Selects Coupler 557 (modulated transmit signal 583) | Selects Mixer Unit 545 |
| 7 | Pre-distortion of digital transmit signal 571 | Digital transmit signal 571 | Digital feedback signal 589 | Selects Coupler 556 (modulated transmit signal 580) | Selects Mixer Unit 540 |
| 8 | Pre-distortion of digital transmit signal 575 | Digital transmit signal 575 | Digital feedback signal 589 | Selects Coupler 557 (modulated transmit signal 583) | Selects Mixer Unit 545 |

SIGNAL CORRECTION FOR CARRIER AGGREGATION TRANSCEIVER

TECHNICAL FIELD

The exemplary embodiments relate generally to wireless communications, and specifically to signal correction for wireless devices supporting carrier aggregation.

BACKGROUND OF RELATED ART

A wireless device (e.g., a cellular phone or a smartphone) in a wireless communication system may transmit and receive data for two-way communication. The wireless device may include a transmitter for data transmission and a receiver for data reception. For data transmission, the transmitter may modulate a radio frequency (RF) carrier signal with data to generate a modulated RF signal, amplify the modulated RF signal to generate a transmit RF signal having the proper output power level, and transmit the transmit RF signal via an antenna to a base station. For data reception, the receiver may obtain a received RF signal via the antenna and may amplify and process the received RF signal to recover data sent by the base station.

The wireless device may support two-way communication on multiple frequency bands and/or multiple radio technologies. The wireless device may also support carrier aggregation, which is simultaneous operation on multiple carriers. A carrier may refer to a range of frequencies used for two-way communication and may be associated with certain characteristics. For example, a carrier may be associated with a communication system (e.g., Wi-Fi, cellular) and/or a communication protocol (e.g., IEEE 802.11, BLUETOOTH, LTE, etc.) A carrier may also be referred to as a component carrier (CC), a frequency channel, a cell, etc.

When multiple transmitters operate simultaneously, communication signals associated with a first transmitter may undesirably interfere with communication signals associated with a second transmitter. For example, communication signals from the second transmitter may cause intermodulation distortion in the first communication signal.

Thus, there is a need to improve performance of multiple transmitters in wireless devices, especially wireless devices supporting carrier aggregation.

BRIEF DESCRIPTION OF THE DRAWINGS

The present embodiments are illustrated by way of example and are not intended to be limited by the figures of the accompanying drawings. Like numbers reference like elements throughout the drawings and specification.

FIG. 8B is an illustrative table depicting exemplary modes of operation for the transceiver of FIG. 5.

DETAILED DESCRIPTION

In the following description, numerous specific details are set forth such as examples of specific components, circuits, and processes to provide a thorough understanding of the present disclosure. The term "coupled" as used herein means coupled directly to or coupled through one or more intervening components or circuits. Also, in the following description and for purposes of explanation, specific nomenclature and/or details are set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scope all embodiments defined by the appended claims.

In addition, the detailed description set forth below in connection with the appended drawings is intended as a description of exemplary embodiments of the present disclosure and is not intended to represent the only embodiments in which the present disclosure may be practiced. The term "exemplary" used throughout this description means "serving as an example, instance, or illustration," and should not necessarily be construed as preferred or advantageous over other embodiments.

Figure 1:
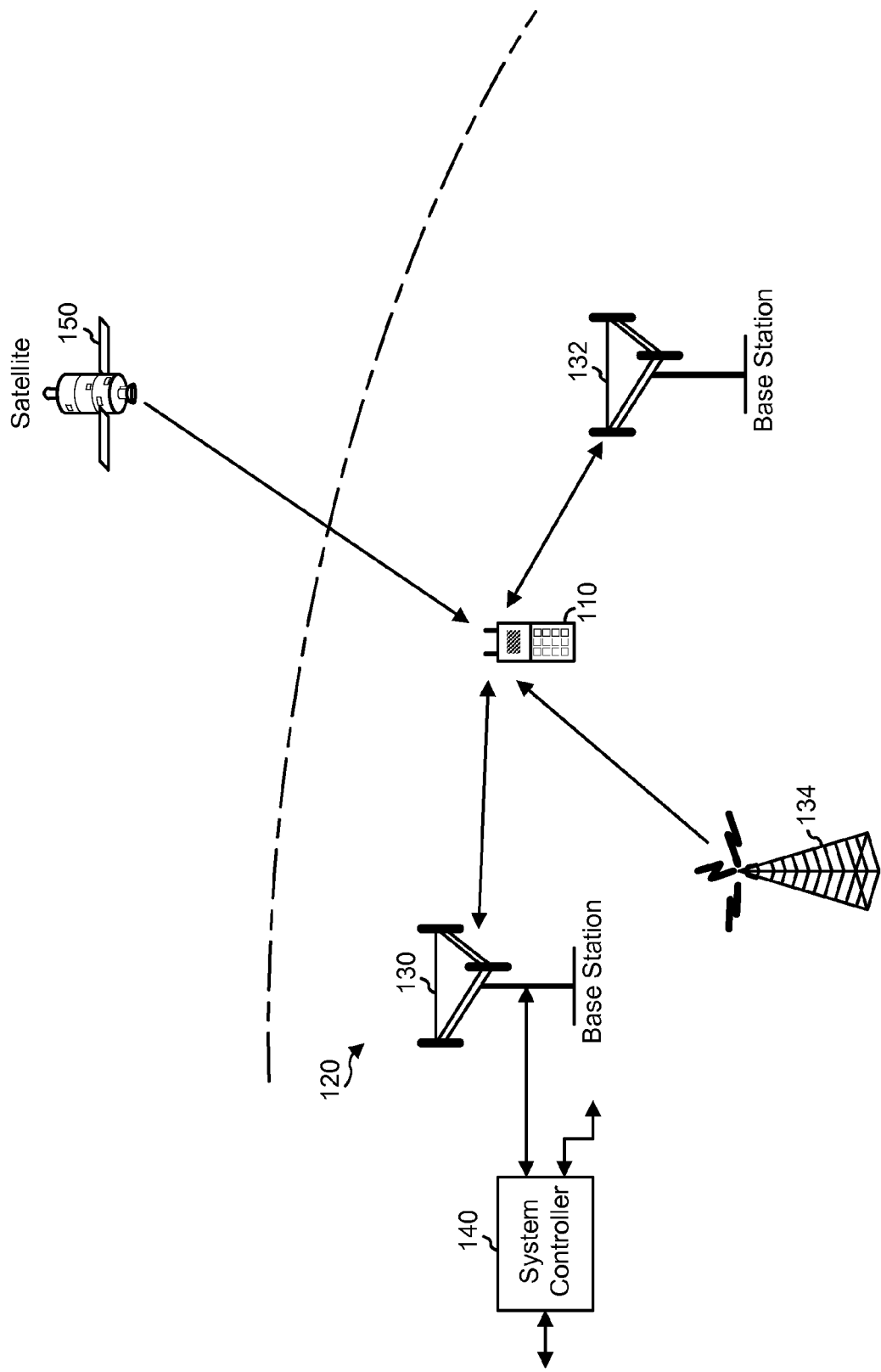
FIG. 1 shows a wireless device communicating with a wireless communication system, in accordance with some exemplary embodiments.

FIG. 1 shows a wireless device 110 communicating with a wireless communication system 120, in accordance with some exemplary embodiments. Wireless communication system 120 may be a Long Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1x, Evolution-Data Optimized (EVDO), Time Division Synchronous CDMA (TD-SCDMA), or some other version of CDMA. For simplicity, FIG. 1 shows wireless communication system 120 including two base stations 130 and 132 and one system controller 140. In general, a wireless system may include any number of base stations and any set of network entities.

Wireless device 110 may also be referred to as a user equipment (UE), a mobile station, a terminal, an access terminal, a subscriber unit, a station, etc. Wireless device 110 may be a cellular phone, a smartphone, a tablet, a wireless modem, a personal digital assistant (PDA), a handheld device, a laptop computer, a smartbook, a netbook, a cordless phone, a wireless local loop (WLL) station, a Bluetooth device, etc. Wireless device 110 may communicate with wireless communication system 120. Wireless device 110 may also receive signals from broadcast stations (e.g., a broadcast station 134), signals from satellites (e.g., a satellite 150) in one or more global navigation satellite systems (GNSS), etc. Wireless device 110 may support one or more radio technologies for wireless communication such as LTE, WCDMA, CDMA 1x, EVDO, TD-SCDMA, GSM, 802.11, etc.

Figure 2:
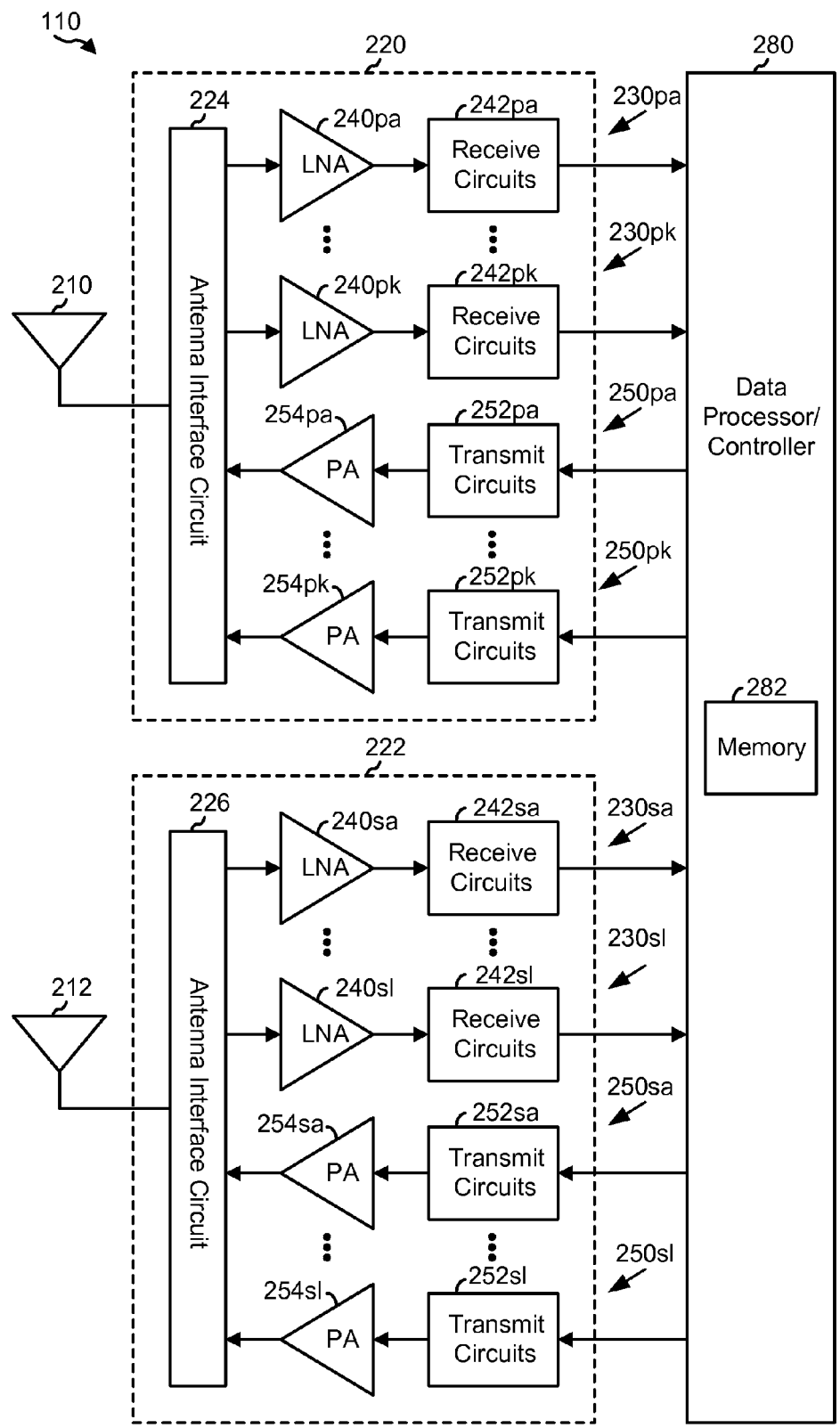
FIG. 2 shows an exemplary design of a receiver and a transmitter of FIG. 1.

FIG. 2 shows a block diagram of an exemplary design of wireless device 110 in FIG. 1. In this exemplary design, wireless device 110 includes a primary transceiver 220 coupled to a primary antenna 210, a secondary transceiver 222 coupled to a secondary antenna 212, and a data processor/controller 280. Primary transceiver 220 includes a number (K) of receivers 230pa to 230pk and a number (K) of transmitters 250pa to 250pk to support multiple frequency bands, multiple radio technologies, carrier aggregation, etc. Secondary transceiver 222 includes a number (L) of receivers 230sa to 230sl and a number (L) of transmitters 250sa to 250sl to support multiple frequency bands, multiple radio technologies, carrier aggregation, receive diversity, multiple-input multiple-output (MIMO) transmission from multiple transmit antennas to multiple receive antennas, etc.

In the exemplary design shown in FIG. 2, each receiver 230 includes a low noise amplifier (LNA) 240 and receive circuits 242. For data reception, primary antenna 210 receives signals from base stations and/or other transmitter stations and provides a received radio frequency (RF) signal, which is routed through an antenna interface circuit 224 and presented as an input RF signal to a selected receiver. Antenna interface circuit 224 may include switches, duplexers, transmit filters, receive filters, matching circuits, etc. The description below assumes that receiver 230pa is the selected receiver. Within receiver 230pa, an LNA 240pa amplifies the input RF signal and provides an output RF signal. Receive circuits 242pa downconvert the output RF signal from RF to baseband, amplify and filter the downconverted signal, and provide an analog input signal to data processor/controller 280. Receive circuits 242pa may include mixers, filters, amplifiers, matching circuits, an oscillator, a local oscillator (LO) generator, a phase locked loop (PLL), etc. Each remaining receiver 230 in transceivers 220 and 222 may operate in similar manner as receiver 230pa.

In the exemplary design shown in FIG. 2, each transmitter 250 includes transmit circuits 252 and a power amplifier (PA) 254. For data transmission, data processor/controller 280 processes (e.g., encodes and modulates) data to be transmitted and provides an analog output signal to a selected transmitter. The description below assumes that transmitter 250pa is the selected transmitter. Within transmitter 250pa, transmit circuits 252pa amplify, filter, and upconvert the analog output signal from baseband to RF and provide a modulated RF signal. Transmit circuits 252pa may include amplifiers, filters, mixers, matching circuits, an oscillator, an LO generator, a PLL, etc. A PA 254pa receives and amplifies the modulated RF signal and provides a transmit RF signal having the proper output power level. The transmit RF signal is routed through antenna interface circuit 224 and transmitted via primary antenna 210. Each remaining transmitter 250 in transceivers 220 and 222 may operate in similar manner as transmitter 250pa.

Each receiver 230 and transmitter 250 may also include other circuits not shown in FIG. 2, such as filters, matching circuits, etc. All or a portion of transceivers 220 and 222 may be implemented on one or more analog integrated circuits (ICs), RF ICs (RFICs), mixed-signal ICs, etc. For example, LNAs 240 and receive circuits 242 within transceivers 220 and 222 may be implemented on multiple IC chips, as described below. The circuits in transceivers 220 and 222 may also be implemented in other manners.

Data processor/controller 280 may perform various functions for wireless device 110. For example, data processor/controller 280 may perform processing for data being received via receivers 230 and data being transmitted via transmitters 250. Data processor/controller 280 may control the operation of the various circuits within transceivers 220 and 222. A memory 282 may store program codes and data for data processor/controller 280. Data processor/controller 280 may be implemented on one or more application specific integrated circuits (ASICs) and/or other ICs.

Figure 3:
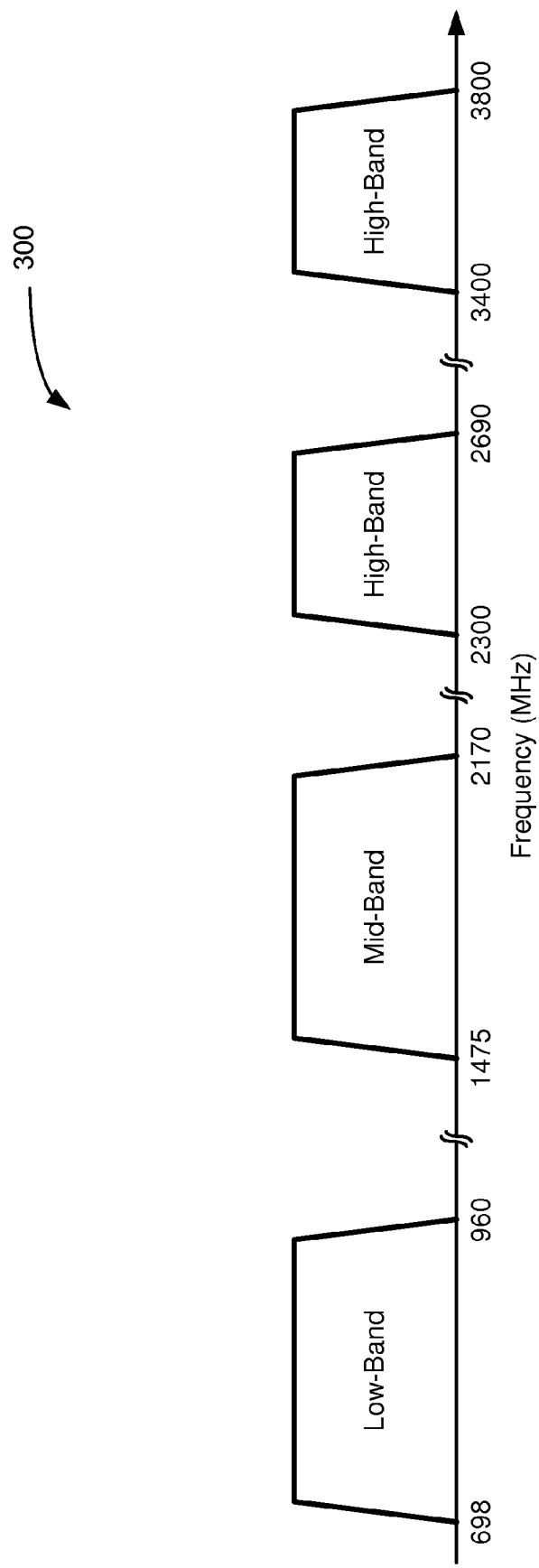
FIG. 3 is a band diagram depicting three exemplary band groups that may be supported by the wireless device of FIG. 1.

FIG. 3 is a band diagram 300 depicting three exemplary band groups that may be supported by wireless device 110. In some embodiments, wireless device 110 may operate in a low-band (LB) including RF signals having frequencies lower than 1000 megahertz (MHz), a mid-band (MB) including RF signals having frequencies from 1000 MHz to 2300 MHz, and/or a high-band (HB) including RF signals having frequencies higher than 2300 MHz. For example, low-band RF signals may cover from 698 MHz to 960 MHz, mid-band RF signals may cover from 1475 MHz to 2170 MHz, and high-band RF signals may cover from 2300 MHz to 2690 MHz and from 3400 MHz to 3800 MHz, as shown in FIG. 3. Low-band, mid-band, and high-band refer to three groups of bands (or band groups), with each band group including a number of frequency bands (or simply, "bands"). Each band may cover up to 200 MHz. LTE Release 11 supports 35 bands, which are referred to as LTE/UMTS bands and are listed in 3GPP TS 36.101.

In general, any number of band groups may be defined. Each band group may cover any range of frequencies, which may or may not match any of the frequency ranges shown in FIG. 3. Each band group may also include any number of bands.

Figure 4:
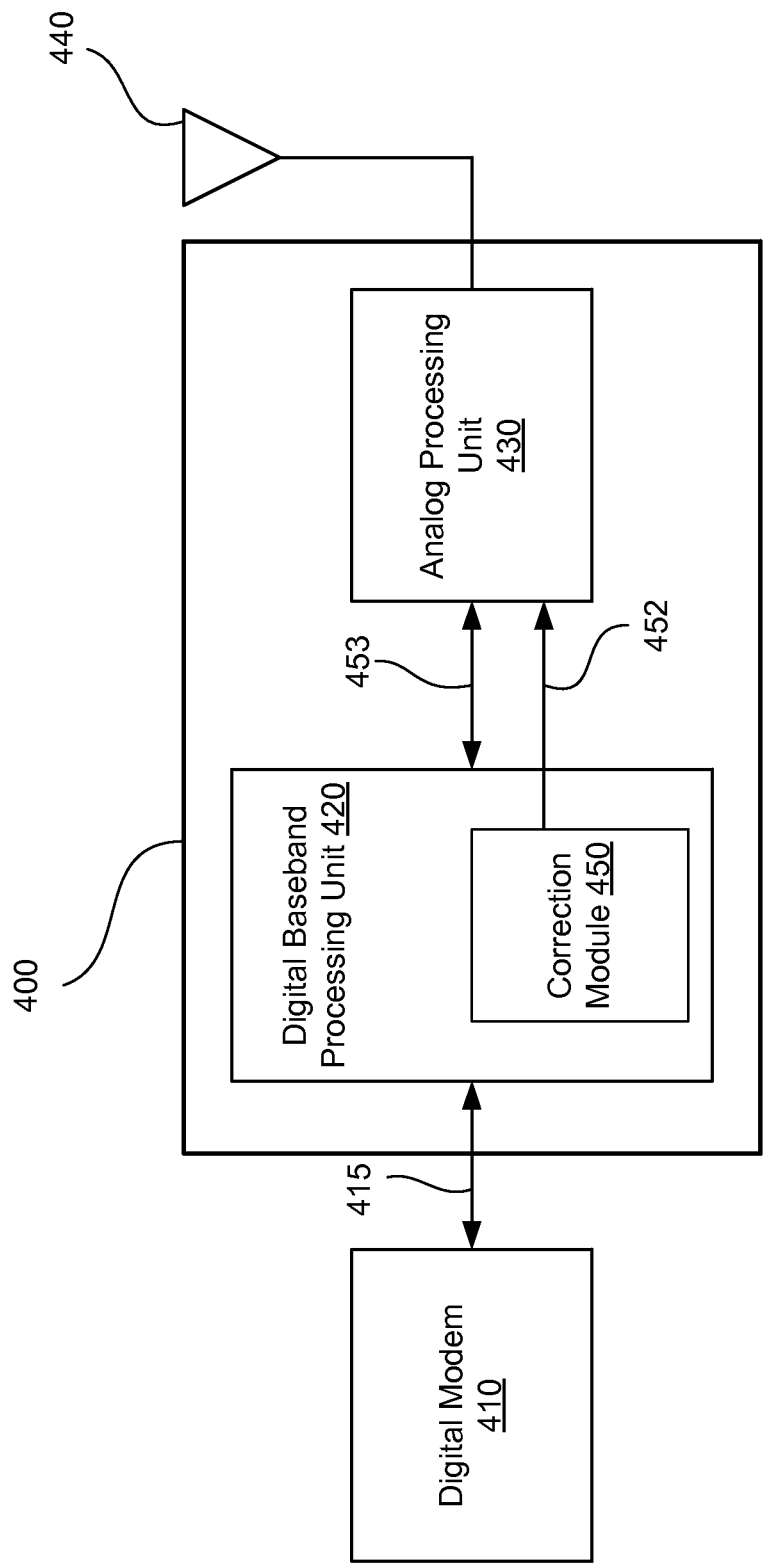
FIG. 4 is a simplified block diagram of a transceiver included within the wireless device of FIG. 2.

FIG. 4 is a simplified block diagram of a transceiver 400 that may be included within wireless device 110 of FIG. 2. For example, transceiver 400 may be primary transceiver 220 or secondary transceiver 222. Transceiver 400 may exchange digital communication signals 415 with a digital modem 410. In some embodiments, digital modem 410 may be included within data processor/controller 280. Digital modem 410 may provide digital communication signals to transceiver 400, and/or may receive digital communication signals from transceiver 400.

Transceiver 400 may include a digital baseband processing unit 420 and an analog processing unit 430. In some embodiments, digital baseband processing unit 420 may convert digital communication signals 415 (e.g., digital transmit and/or receive communication signals) to analog communication signals 453 (e.g., analog transmit and/or receive communication signals). For example, a digital transmit communication signal may be received from digital modem 410 by digital baseband processing unit 420. The digital transmit communication signal may be processed by a digital-to-analog converter (not shown for simplicity) included within digital baseband processing unit 420 to generate an analog transmit communication signal. Analog processing unit 430 may receive the analog transmit communication signal, upconvert, and then transmit the upconverted signal through antenna 440. In a similar manner, a communication signal may be received by antenna 440, downconverted to an analog receive communication signal by analog processing unit 430, and converted to a digital receive communication signal through an analog-to-digital converter (not shown for simplicity) included within digital baseband processing unit 420.

In some embodiments, digital baseband processing unit 420 may include a correction module 450 to generate a correction signal 452. Correction signal 452 may be used to correct one or more impairments associated with the analog transmit communication signal. For example, correction signal 452 may cancel all or part of an intermodulation distortion associated with the analog transmit communication signal, equalize the analog transmit communication signal, and/or pre-distort the analog transmit communication signal. In some embodiments, correction signal 452 may be combined with the analog transmit communication signal within analog processing unit 430. Operation of correction module 450 and generation of correction signal 452 is described in more detail in conjunction with FIGS. 5-7 below.

Figure 5:
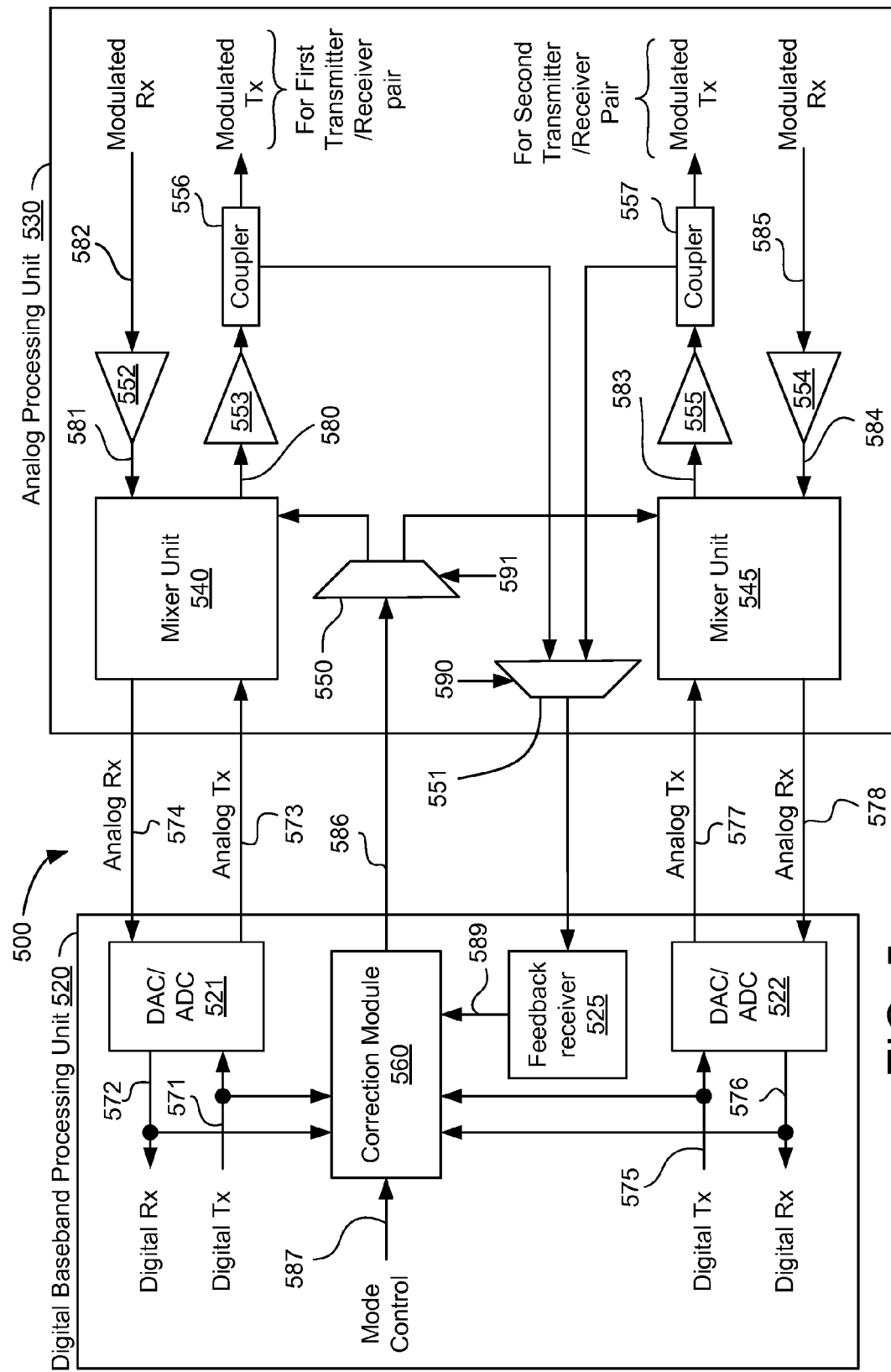
FIG. 5 is a block diagram of another embodiment of a transceiver included within the wireless device of FIG. 2.

FIG. 5 is block diagram of another embodiment of a transceiver 500 that may be included within wireless device 110 of FIG. 2. Transceiver 500 may include digital baseband processing unit 520 and analog processing unit 530. Similar to transceiver 400, digital baseband processing unit 520 may convert digital communication signals (e.g., digital baseband signals) from digital modem 410 (not shown for simplicity) to analog communication signals (e.g., analog baseband signals) for analog processing unit 530. Additionally, digital baseband processing unit 520 may convert analog communication signals from analog processing unit 530 to digital communication signals for digital modem 410.

Digital baseband processing unit 520 may include a digital-to-analog converter (DAC)/analog-to-digital converter (ADC) unit 521, a DAC/ADC unit 522, a correction module 560, and a feedback receiver 525. DAC/ADC unit 521 may receive a digital transmit communication signal 571 associated with a first transmitter from digital modem 410 (not shown in FIG. 5 for simplicity). DAC/ADC unit 521 may convert digital transmit communication signal 571 to an analog transmit communication signal 573. Additionally, DAC/ADC unit 521 may receive an analog receive communication signal 574 associated with a first receiver and, in response thereto, may generate a digital receive communication signal 572. In some embodiments, transceiver 500 may support two or more transmitter/receiver pairs. Thus, DAC/ADC unit 522 may receive a digital transmit communication signal 575 associated with a second transmitter from digital modem 410 and, in response thereto, generate an analog transmit communication signal 577 for analog processing unit 530. DAC/ADC unit 522 may also receive an analog receive communication signal 578 associated with a second receiver and, in response thereto, generate a digital receive communication signal 576. Persons skilled in the art will appreciate that digital baseband processing unit 520 and analog processing unit 530 may process quadrature and/or differential signals. For example, digital transmit communication signal 571 may include two signals: a digital in-phase signal and a digital quadrature signal. Furthermore, in some embodiments, the digital in-phase signal and the digital quadrature signal may be differential signals.

Analog processing unit 530 may include a first mixer unit 540, a second mixer unit 545, output selector 550, feedback signal selector 551, amplifiers 552-555, a first coupler 556, and a second coupler 557. Analog communication signals may be exchanged between digital baseband processing unit 520 and analog processing unit 530. Thus, analog communication signals associated with a first transmitter/receiver pair (e.g., analog transmit communication signal 573 and analog receive communication signal 574) may be coupled between mixer unit 540 and DAC/ADC unit 521. In a similar manner, analog communication signals associated with a second transmitter/receiver pair (e.g., analog transmit communication signal 577 and analog receive communication signal 578) may be coupled between mixer unit 545 and DAC/ADC unit 522.

In some embodiments, mixer unit 540 may upconvert analog transmit communication signal 573 based on a local oscillator signal (not shown in FIG. 5 for simplicity), and generate a modulated transmit communication signal 580. Mixer unit 540 may also downconvert a modulated receive communication signal 581, and generate analog receive communication signal 574. In some embodiments, modulated transmit communication signal 580 may be buffered by amplifier 553, and a received modulated communication signal 582 may be buffered by amplifier 552. In a similar manner, mixer unit 545 may upconvert analog transmit communication signal 577 and generate a modulated transmit communication signal 583. Mixer unit 545 may also downconvert a modulated receive communication signal 584, and generate analog receive communication signal 578. In some embodiments, modulated transmit communication signal 583 may be buffered by amplifier 555, and a received modulated communication signal 585 may be buffered by amplifier 554.

Correction module 560 may generate a correction signal 586 to correct one or more impairments that may be associated with a modulated transmit communication signal. In some embodiments, correction module 560 may be another embodiment of correction module 450 described in FIG. 4. In a similar manner, correction signal 586 may be another embodiment of correction signal 452 of FIG. 4. In one embodiment, correction signal 586 may correct for an intermodulation distortion caused by another transmit communication signal. For example, when both the first transmitter and the second transmitter operate at or near the same time, the first transmitter may induce a distortion (such as an intermodulation distortion) in the second transmitter. Correction module 560 may generate correction signal 586 to counteract (or reduce) the intermodulation distortion in the second transmitter. In another embodiment, correction signal 586 may correct or counteract one or more non-linearities associated with a transmit communication signal. For example, correction signal 586 may pre-distort or equalize a transmit communication signal.

Correction module 560 may generate correction signal 586 based on digital transmit communication signal 571, digital receive communication signal 572, digital transmit communication signal 575, digital receive communication signal 576, a digital feedback signal 589, and/or correction module mode control signal 587. In some embodiments, feedback receiver 525 may receive and demodulate a modulated transmit communication signal, generate a digital feedback signal 589 based on the demodulated transmit communication signal, and provide the digital feedback signal 589 to correction module 560. Feedback receiver 525 may be coupled to a feedback signal selector 551. Feedback signal selector 551 may select a modulated transmit communication signal associated with the first transmitter or the second transmitter based on a feedback selector control signal 590. In some embodiments, the modulated analog transmit signal may be provided by amplifier 553 and/or amplifier 555. A coupler 556 may provide the modulated analog transmit signal associated with the first transmitter to feedback signal selector 551. In a similar manner, coupler 557 may provide the modulated analog transmit signal associated with the second transmitter to feedback signal selector 551. In some embodiments, coupler 556 and coupler 557 may be directional couplers. Operation of correction module 560 and feedback signal selector 551 is described in more detail below in conjunction with FIGS. 6 and 8.

Correction signal 586 may be added to a modulated transmit communication signal associated with analog transmit communication signal 573 or a modulated transmit communication signal associated with analog transmit communication signal 577 within mixer unit 540 and mixer unit 545, respectively. In some embodiments, correction signal 586 may be converted from a digital signal to an analog signal through one or more DACs (not shown for simplicity). Operations of mixer unit 540 and mixer unit 545 are described in more detail below in conjunction with FIG. 7. In some embodiments, correction signal 586 may be routed to either mixer unit 540 or mixer unit 545 through output selector 550. Output selector 550 may be controlled by output selector control signal 591. Operations of output selector 550 are described in more detail below in conjunction with FIG. 8.

Figure 6A:
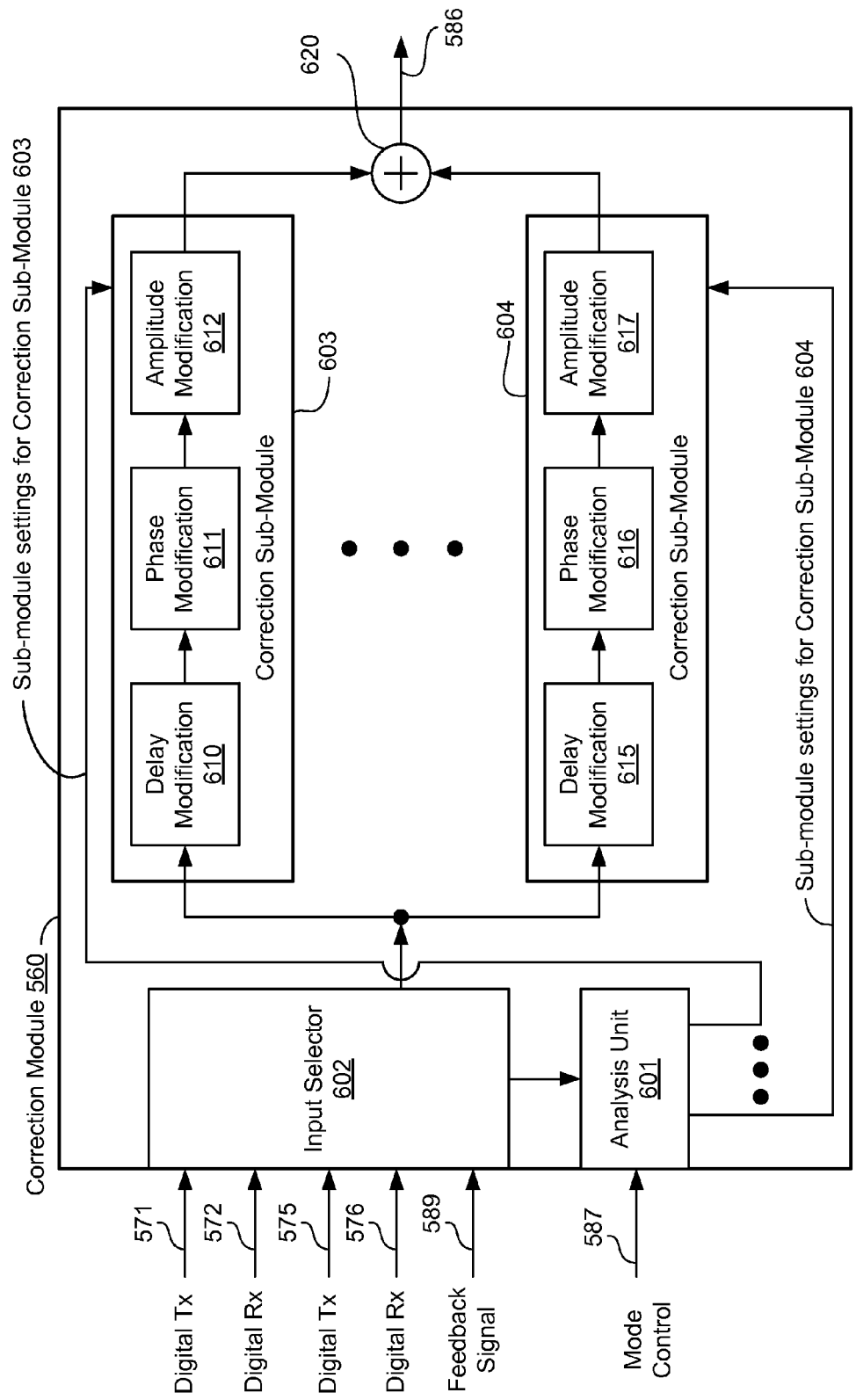
FIG. 6A is a block diagram of a correction module, according to some embodiments.

FIG. 6A is a block diagram of correction module 560, according to some embodiments. Correction module 560 may include input selector 602, analysis unit 601, a first correction sub-module 603, a second correction sub-module 604, and summing node 620. Although only first correction sub-module 603 and second correction sub-module 604 are shown, other embodiments of correction module 560 may include other numbers of correction sub-modules (not shown for simplicity). For example, some embodiments of correction module 560 may include a number N of correction sub-modules.

Each correction sub-module may include a phase modification unit, a delay modification unit, and an amplification modulation unit. For example, first correction sub-module 603 may include delay modification unit 610, phase modification unit 611, and amplitude modification unit 612. In a similar manner, second correction sub-module 604 may include delay modification unit 615, phase modification unit 616, and amplitude modification unit 617. Other embodiments of correction sub-units may include fewer than three modification units, additional units, and/or duplicate (e.g., redundant) units.

A digital communication signal may be provided by input selector 602 to the first correction sub-module 603 and/or the second correction sub-module 604. Input selector 602 may receive digital transmit communication signal 571, digital receive communication signal 572, digital transmit communication signal 575, digital receive communication signal 576, and digital feedback signal 589. In one embodiment, first correction sub-module 603 and/or second correction sub-module 604 may modify, a timing (e.g., delay), a phase, and/or an amplitude of a selected digital communication signal. For example, first correction sub-module 603 may adjust a delay of a digital communication signal by delaying the digital communication signal through delay modification unit 610. Additionally, phase modification unit 611 may adjust the phase of the digital communication signal, and amplitude modification unit 612 may increase or decrease an amplitude associated with the digital communication signal. In a similar manner, a digital communication signal may be modified by second correction sub-module 604. Although depicted in an exemplary order in FIG. 6A, in other embodiments, delay modification units 610 and 615, phase modification units 611 and 616, and amplitude modification units 612 and 617 may be arranged in any technically feasible order. Thus, delay, phase, and amplitude modifications may occur in any technically feasible order within first correction sub-module 603 and/or second correction sub-module 604.

In some embodiments, phase, delay, and amplitude modifications may be accomplished by digital filters having a plurality of filter taps. For example, delay modification unit 610, phase modification unit 611, and/or amplitude modification unit 612 may each include a digital filter (e.g., a finite impulse response (FIR) or infinite impulse response (IIR) filter) to modify a phase, delay, and amplitude of a digital signal, respectively. In a similar manner, delay modification unit 615, phase modification unit 616, and amplitude modification unit 617 may each include digital filters.

In some embodiments, an amount of phase modification, delay modification, and/or amplitude modification provided within first correction sub-module 603 and/or second correction sub-module 604 may be determined by sub-module settings provided by analysis unit 601. In some embodiments, sub-module settings may configure one or more filter taps within the associated correction sub-module. For example, sub-module settings for first correction sub-module 603 may configure filter taps within delay modification unit 610, phase modification unit 611, and/or amplitude modification unit 612. In a similar manner, sub-module settings for second correction sub-module 604 may configure filter taps within delay modification unit 615, phase modification unit 616, and/or amplitude modification unit 617. In some embodiments, output signals from each correction sub-module may be summed together at summing node 620 to generate correction signal 586.

In one embodiment, correction module 560 may be configured to generate a correction signal 586 based on an operating mode. For example, some operating modes may generate correction signal 586 to reduce or attenuate an intermodulation distortion. Intermodulation distortion may be caused by an aggressor signal interfering with a victim signal. For example, a first modulated transmit communication signal (the aggressor signal) may interfere with a second modulated transmit communication signal (the victim signal). In another example, the second modulated transmit communication signal (the aggressor signal) may interfere with the first modulated transmit communication signal (the victim signal). Thus, in some embodiments, correction signal 586 may be configured to reduce interference from an aggressor signal to one or more victim signals.

In a first operating mode (e.g., calibration mode), initial sub-module settings for first correction sub-module 603 and/or second correction sub-module 604 may be determined by analysis unit 601 to reduce or attenuate an intermodulation distortion. The victim signal may be modulated transmit communication signal 580 and the aggressor signal may be modulated transmit communication signal 583 (see also FIG. 5). Initial sub-module settings may be based on the aggressor signal received at analysis unit 601. Thus, input selector 602 may provide digital transmit communication signal 575 to first correction sub-module 603 and second correction sub-module 604, and may provide digital feedback signal 589 to analysis unit 601. In some embodiments, the digital feedback signal 589 may be associated with the victim signal (e.g., modulated transmit communication signal 580).

In some embodiments, during initialization, a received signal r(t) may be expressed with eq. 1 below:

$$r(t)=h(t)*x(t)+g(t)*x(t) \quad (\text{eq. 1})$$

where h(t) is a function describing leaking paths;
x(t) is a function describing an aggressor signal; and
g(t) is a function describing the cancelling signal.

Thus, eq. 1 expresses that a received signal may include two components during an initialization period (e.g., when the victim transmitter is not transmitting): a first component due to leaking paths (intermodulation, for example) and a second component due to the cancelling signal g(t). To determine the first component due to leaking paths, the cancelling signal g(t) component may be set to zero as shown in eq. 2:

$$g(t)=0 \quad (\text{eq. 2})$$

Next, the received signal may be recorded (e.g., a number M samples of received signal may be recorded) by analysis unit 601 yielding eq. 3 below:

$$r(t)=h(t)*x(t) \quad (\text{eq. 3})$$

Thus, for cancelling signal g(t) to remove affects from the aggressor signal:

$$h(t)*x(t)=g(t)*x(t) \quad (\text{eq. 4})$$

Since received signal r(t) may include a discrete number of samples M associated with the recording described above, r(t) may be expressed as a vector, as shown in eq. 5 below:

$$r=hX \quad (\text{eq. 5})$$

Thus, solving for cancelling signal g(t) is shown in eq. 6, below:

$$g=-rX^+ \quad (\text{eq. 6})$$

where $X^+$ is a pseudo inverse of X (e.g., $X^+=(X^H X)^{-1} X^H$).

In this manner, an initial value of the cancelling signal g(t) may be determined. For example, while the transmitter associated with the victim signal is on, but not transmitting data, a received signal (digital feedback signal 589) may be recorded by analysis unit 601. Analysis unit 601 may then determine cancelling signal g(t) and, moreover, may determine how to generate g(t) based on the aggressor signal. In other embodiments, repeated sampling and estimations may be used to determine cancelling signal g(t). For example, least-mean-square (LMS) and/or recursive-least-squares (RLS) operations may be used to determine cancelling signal g(t). In still other embodiments, a combination of LMS, RLS and/or eq. 6 may be used.

Thus, analysis unit 601 may determine sub-module settings to generate cancelling signal g(t) (e.g., using eq. 6). In some embodiments, cancelling signal g(t) may describe and/or be associated with tap values for digital filters (e.g., FIR or IIR filters) within correction sub-module 603 and/or correction sub-module 604. In some embodiments, more than one correction sub-module may be used to generate cancelling signal g(t). Thus, analysis unit 601 may determine sub-module settings for a plurality of correction sub-modules to generate cancelling signal g(t) (e.g., correction signal 586). First correction sub-module 603 and/or second correction sub-module 604 may modify digital transmit communication signal 575 and generate correction signal 586. Correction signal 586 may be added to the victim signal (e.g., modulated transmit communication signal 580 within mixer unit 540) to reduce or attenuate intermodulation distortion.

In a second operating mode (e.g., normal operating mode), sub-module settings for first correction sub-module 603 and second correction sub-module 604 may be determined by analysis unit 601 to reduce or attenuate intermodulation distortion. In contrast to the first operating mode, the second operating mode may update and/or refine initial sub-module settings determined during the first operating mode. Similar to the first operating mode, the victim signal may be modulated transmit communication signal 580 and the aggressor signal may be modulated transmit communication signal 583. Input selector 602 may provide digital transmit communication signal 575 to first correction sub-module 603 and second correction sub-module 604. Input selector 602 may provide digital receive communication signal 572 or digital receive communication signal 576 to analysis unit 601. Analysis unit 601 may use digital receive communication signal 572 or digital receive communication signal 576 to determine settings for first correction sub-module 603 and/or second correction sub-module 604. Thus, first correction sub-module 603 and/or second correction sub-module 604 may modify digital transmit communication signal 571 and generate correction signal 586 to reduce or attenuate intermodulation distortion. Correction signal 586 may be added to analog transmit communication signal 573 within mixer unit 540.

Analysis unit 601 may determine updated sub-module settings for first correction sub-module 603 and/or second correction sub-module 604 using the procedures described above in the first operating mode or any other technically feasible method. In some embodiments, a bit error rate or noise floor measurements associated with the victim signal may be used to determine new sub-module settings. For example, LMS and/or RLS iterations to determine sub-module settings may be repeated until the victim signal has a bit error rate or a noise floor measurement less than a predetermined threshold.

In the first operating mode and the second operating mode described above, the victim signal is modulated transmit communication signal 580, and the aggressor signal is modulated transmit communication signal 583. Other modes may support other victim and aggressor signals. For example, a third operating mode may determine initial sub-module settings for first correction sub-module 603 and/or second correction sub-module 604 when the victim signal is modulated transmit communication signal 583 and the aggressor signal is modulated transmit communication signal 580. In a similar manner, in a fourth operating mode, updated sub-module settings for first correction sub-module 603 and/or second correction sub-module 604 may be determined by analysis unit 601 to reduce or attenuate intermodulation distortion. Settings and operations for the third operating mode and the fourth operating mode may be determined in a similar manner as described above for the first operating mode and the second operating mode. In the third operating mode and the fourth operating mode, different signals may be coupled to first correction sub-module 603, second correction sub-module 604, and analysis unit 601 as described in Table 1 in conjunction with FIG. 8 below.

In a fifth operating mode, correction module 560 may be configured to generate a correction signal 586 to equalize the output of the first transmitter. Thus, instead of correcting impairments caused by an aggressor signal, correction signal 586 may correct for impairments caused by signal processing associated with the first transmitter. In some embodiments, signal processing characteristics associated with the first transmitter may be determined during a bench test or a simulation. Thus, settings (e.g., settings associated with equalizing signals for the first transmitter) that may be applied to first correction sub-module 603 and/or second correction sub-module 604 may be determined based on the bench test and/or simulation results, and may be stored within analysis unit 601.

For example, referring also to FIG. 5, mixer unit 540 and/or amplifier 553 may have been characterized and may have an undesired frequency response. Input selector 602 may provide digital transmit communication signal 571 to first correction sub-module 603 and/or second correction sub-module 604. Analysis unit 601 may also receive modulated transmit communication signal 580 through digital feedback signal 589. Analysis unit 601 may determine settings for first correction sub-module 603 and/or second correction sub-module 604 based on digital feedback signal 589 and retrieved settings associated with equalizing signals for the first transmitter. Thus, first correction sub-module 603 and/or second correction sub-module 604 may modify digital transmit communication signal 571 to generate correction signal 586. In one embodiment, correction signal 586 may be added to analog transmit communication signal 573 within mixer unit 540. In another embodiment, correction signal 586 may be a digital signal and may be added to digital transmit communication signal 571 prior to DAC/ADC unit 521.

Other operating modes may configure correction module 560 to generate a correction signal 586 to equalize the output of the second transmitter. For example, referring also to FIG. 5, in a sixth operating mode, mixer unit 545 and/or amplifier 555 may have been characterized and may have an undesired frequency response. Input selector 602 may provide digital transmit communication signal 575 to first correction sub-module 603 and/or second correction sub-module 604. Analysis unit 601 may also receive modulated transmit communication signal 583 through digital feedback signal 589. Analysis unit 601 may determine settings for first correction sub-module 603 and/or second correction sub-module 604 based on digital feedback signal 589 and retrieved settings associated with equalizing signals for the second transmitter. Thus, first correction sub-module 603 and/or second correction sub-module 604 may modify digital transmit communication signal 575 to generate correction signal 586. In one embodiment, correction signal 586 may be added to analog transmit communication signal 577 within mixer unit 545. In another embodiment, correction signal 586 may be a digital signal and may be simply added to digital transmit communication signal 575 prior to DAC/ADC unit 522.

In a seventh operating mode, correction module 560 may be configured to generate a correction signal 586 to pre-distort signals to be output through the first transmitter (e.g., digital transmit communication signal 571). In some embodiments, a digital transmit communication signal may be modified to correct for known impairments associated with some signal processing. Input selector 602 may provide digital transmit communication signal 571 to first correction sub-module 603 and/or second correction sub-module 604. Analysis unit 601 may retrieve stored settings associated with pre-distorting signals for the first transmitter for first correction sub-module 603 and/or second correction sub-module 604. Analysis unit 601 may also receive modulated transmit communication signal 580 through digital feedback signal 589 (via input selector 602). Analysis unit 601 may determine settings for first correction sub-module 603 and/or second correction sub-module 604 based on digital feedback signal 589 and/or retrieved settings associated with pre-distorting signals for the first transmitter. Thus, first correction sub-module 603 and/or second correction sub-module 604 may modify digital transmit communication signal 571 to generate correction signal 586. Correction signal 586 may be added to analog transmit communication signal 573 within mixer unit 540.

Other operating modes may configure correction module 560 to generate a correction signal 586 to pre-distort signals to be output through the second transmitter. For example, in an eighth operating mode, correction module 560 may be configured to generate correction signal 586 to pre-distort signals for the second transmitter (e.g., digital transmit communication signal 575). Input selector 602 may provide digital transmit communication signal 575 to first correction sub-module 603 and/or second correction sub-module 604. Analysis unit 601 may retrieve stored settings associated with pre-distorting signals for the second transmitter for first correction sub-module 603 and/or second correction sub-module 604. Analysis unit 601 may also receive modulated transmit communication signal 583 through digital feedback signal 589. Analysis unit 601 may determine settings for first correction sub-module 603 and/or second correction sub-module 604 based on digital feedback signal 589 and/or retrieved settings associated with pre-distorting signals for the second transmitter. Thus, first correction sub-module 603 and/or second correction sub-module 604 may modify digital transmit communication signal 575 to generate correction signal 586. Correction signal 586 may be added to analog transmit communication signal 577 within mixer unit 545.

Although exemplary operating modes are described above, these operating modes are merely illustrative and are not meant to be limiting.

Figure 6B:
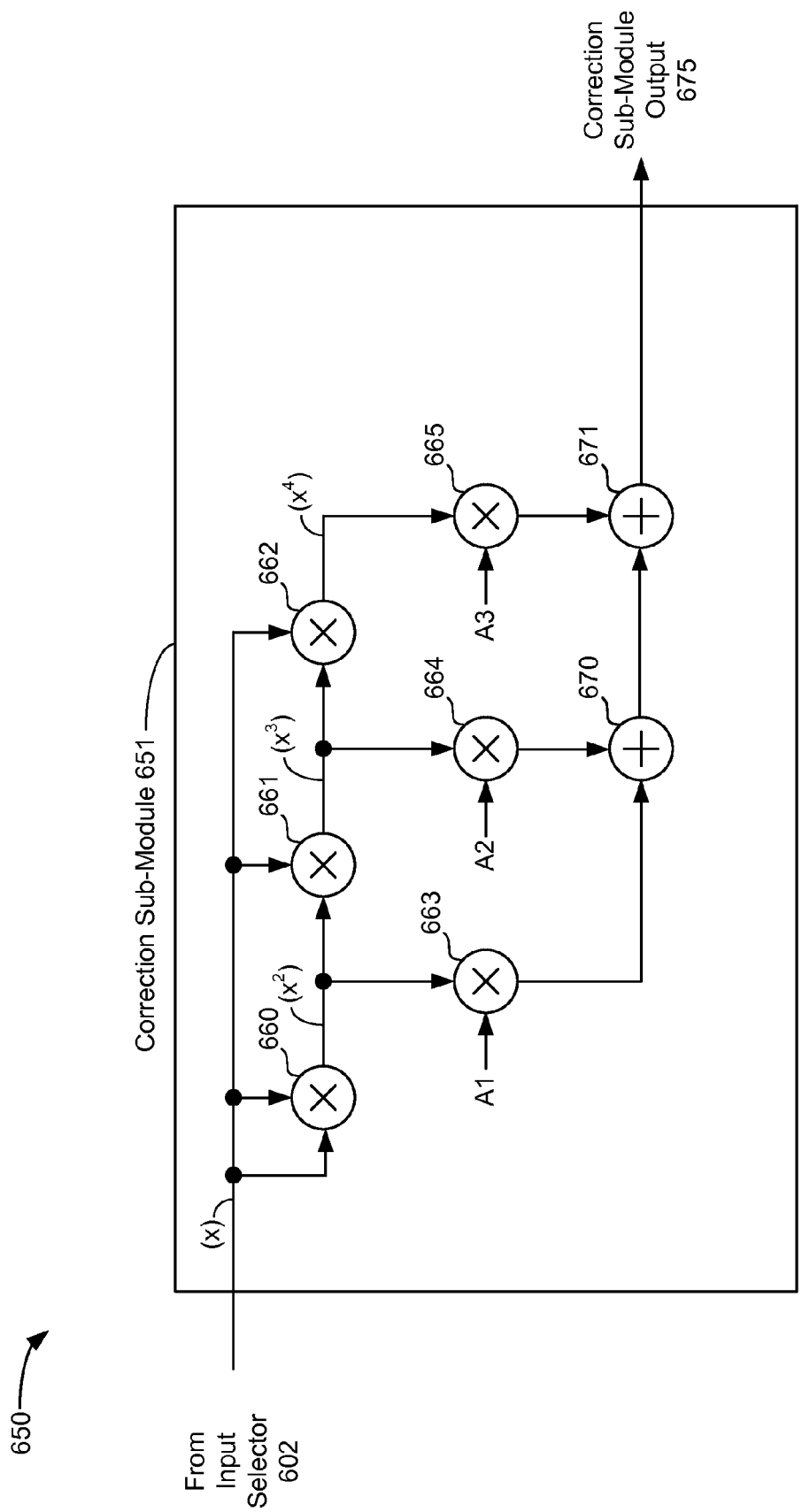
FIG. 6B is a block diagram of another embodiment of a correction sub-module of FIG. 6A.

FIG. 6B is a block diagram 650 of another embodiment of a correction sub-module 651 of FIG. 6A. Correction sub-module 651 may include multipliers 660-665 and adders 670-671. Although only six multipliers and two adders are shown, other embodiments of correction sub-module 651 may include other numbers of multipliers and adders.

Correction sub-module 651 may receive a signal from input selector 602 and may generate a non-linear correction sub-module output signal 675 (e.g., a correction signal having a non-linear frequency response) for correction module 560 (see FIG. 6A). In some embodiments, non-linear frequency responses may be used to pre-distort a transmit communication signal. In some embodiments, multipliers 660-662 may receive the signal from input selector 602 and progressively generate associated exponential signals. For example, an input signal x may be received at two inputs of multiplier 660. In response, multiplier 660 may generate an output signal $x^2$. In a similar manner, multiplier 661 may generate an output signal $x^3$ and multiplier 662 may generate an output signal $x^4$. Additional multipliers (not shown for simplicity) may be used to generate additional non-linear terms.

Output signals from multipliers 660-662 may be provided to multipliers 663-665. Multipliers 663-665 may multiply each output signal from multipliers 660-662 by a gain coefficient (shown as A1-A3 for multipliers 663-665, respectively). Gain coefficients A1-A3 may control an amount of influence (e.g., weight) that each output signal from multipliers 660-662 has on correction sub-module output signal 675. Thus, in some embodiments, sub-module settings associated with correction sub-module 651 may determine values of gain coefficients A1-A3. Adders 670 and 671 may add together output signals from multipliers 663-665 to generate the correction sub-module output signal 675.

In other embodiments, different non-linear frequency responses may be provided by different numbers of multipliers and different configurations of multipliers 660-665 and adders 670-671 within correction sub-module 651. In still other embodiments, a correction sub-module may include both delay, phase, and amplitude modification units 610-612 and multipliers 660-665 and adders 670-671.

Figure 7:
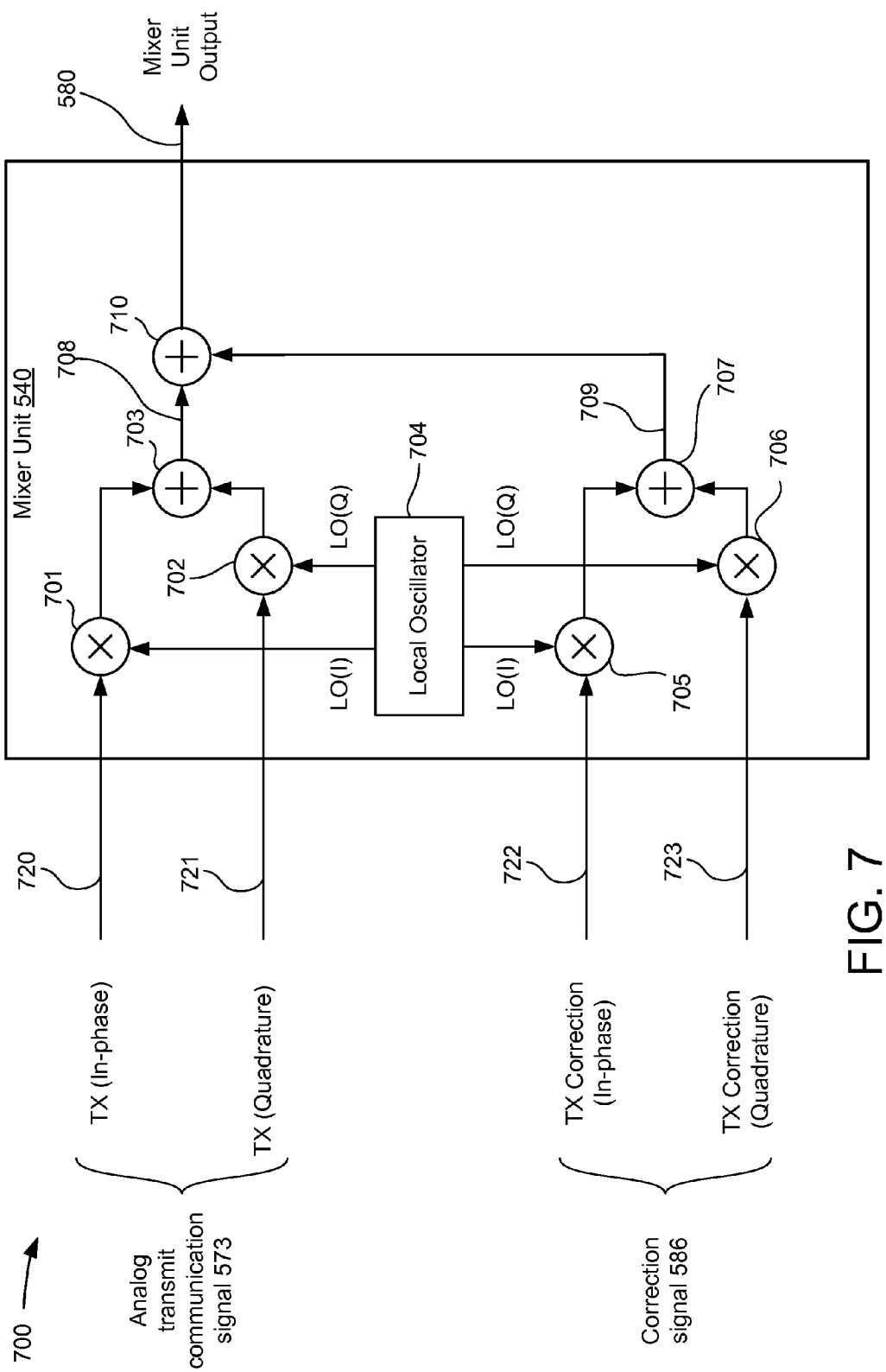
FIG. 7 is a block diagram of a mixer unit of FIG. 5, in accordance with some embodiments.

FIG. 7 is a block diagram 700 of mixer unit 540, in accordance with some embodiments. Mixer unit 700 may include a first mixer 701, second mixer 702, a third mixer 705, a fourth mixer 706, a first summing node 703, a second summing node 707, a third summing node 710, and local oscillator 704. Mixer unit 540 may receive analog transmit communication signal 573 and correction signal 586 (via output selector 550, not shown for in FIG. 7 simplicity). Mixer unit 700 may generate modulated transmit communication signal 580. In some embodiments, analog transmit communication signal 573 may be a quadrature signal having an analog transmit in-phase signal 720 and an analog transmit quadrature signal 721. In a similar manner, correction signal 586 may be a quadrature signal having a correction in-phase signal 722 and a correction quadrature signal 723. In some embodiments, analog transmit in-phase signal 720, analog transmit quadrature signal 721, correction in-phase signal 722, and/or correction quadrature signal 723 may be differential signals (not shown for simplicity).

Mixer unit 700 may modulate one or more signals based on signals provided by local oscillator 704. In some embodiments, local oscillator 704 may generate a local oscillator (LO) signal having a frequency associated with a carrier frequency. In other embodiments, local oscillator 704 may generate quadrature LO signals including an LO in-phase (I) signal and a LO quadrature (Q) signal. In still other embodiments, local oscillator 704 may generate differential LO signals (not shown for simplicity).

In some embodiments, analog transmit communication signal 573 may be "mixed" with an LO signal to generate a partial modulated transmit communication signal 708. A mixer may "mix" together two input signals (e.g., multiply two signals together), and generate an output signal based on a product of the two input signals. In some embodiments, individual I and Q signals may be mixed independently. Therefore, analog transmit in-phase signal 720 may be mixed with LO (I) signal by first mixer 701, and analog transmit quadrature signal 721 may be mixed with LO (Q) signal by second mixer 702. Output signals from first mixer 701 and second mixer 702 may be summed together by first summing node 703 to generate the partial modulated transmit communication signal 708.

In a similar manner, correction signal 586 may be mixed with the LO signal to generate a partial modulated transmit communication signal 709. For example, correction in-phase signal 722 may be mixed with LO (I) signal by third mixer 705, and correction quadrature signal 723 may be mixed with LO (Q) signal by fourth mixer 706. Output signals from third mixer 705 and fourth mixer 706 may be summed together by second summing node 707 to generate partial modulated transmit communication signal 709. Third summing node 710 may sum together partial modulated transmit communication signal 708 and partial modulated transmit communication signal 709 to generate modulated transmit communication signal 580 (e.g., to generate a corrected communication signal). Mixer unit 545 may be substantially similar to mixer unit 700.

Figure 8A:
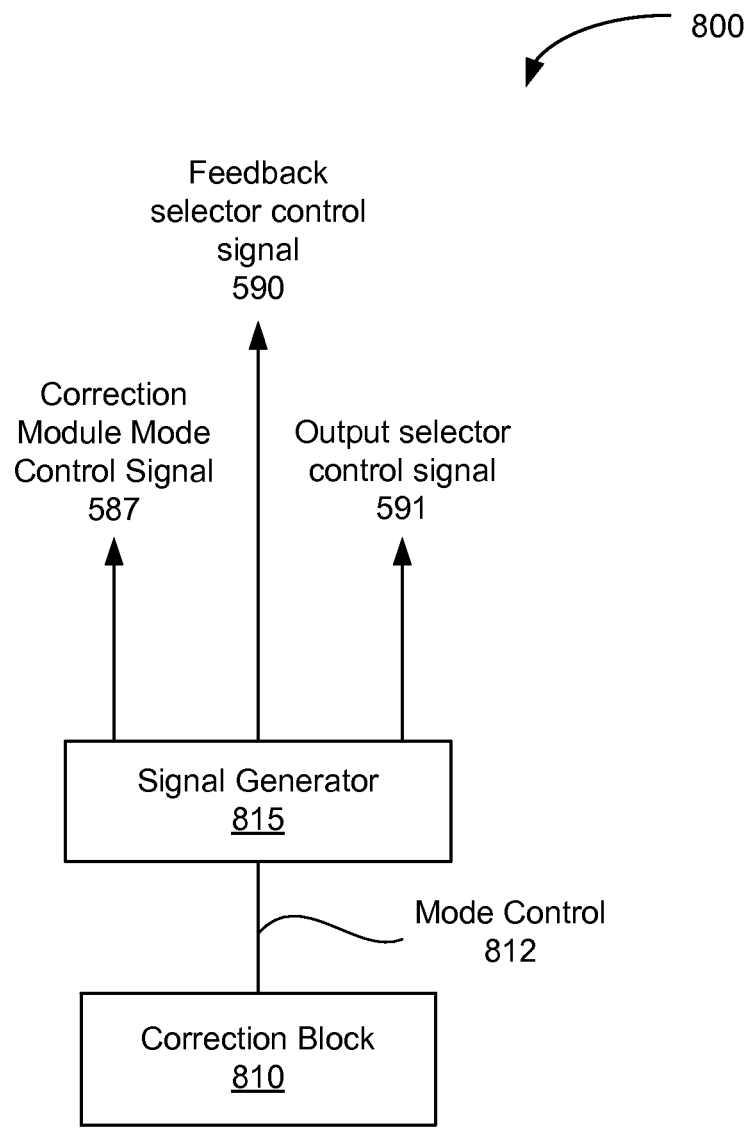
FIG. 8A is a block diagram of a correction module controller, in accordance with some embodiments.

FIG. 8A is a block diagram of a correction module controller 800, in accordance with some embodiments. Correction module controller 800 may be included within transceiver 400, transceiver 500, and/or within correction module 560. In some embodiments, correction module controller 800 may control, at least in part, operations of correction module 560, output selector 550, and/or feedback signal selector 551.

Correction module controller 800 may include control block 810 and signal generator 815. Control block 810 may generate a mode control signal 812 that may cause transceiver 400 or transceiver 500 to operate in one or more of the operating modes described above. For example, control block 810 may generate mode control signal 812 to operate transceiver 500 in a first operating mode to determine initial sub-module settings for first correction sub-module 603 and second correction sub-module 604 to reduce or attenuate intermodulation distortion. In some embodiments, the mode control signal 812 may be determined based on an aggressor signal and a victim signal. In other embodiments, the mode control signal 812 may be determined based on a desired equalization or pre-distortion correction to be applied.

Signal generator 815 may receive mode control signal 812 and, in response thereto, may generate correction module mode control signal 587, feedback selector control signal 590, and/or output selector control signal 591. In some embodiments, the correction module mode control signal 587 may determine one or more operations within analysis unit 601. In other embodiments, feedback selector control signal 590 may determine which signal (from coupler 556 or coupler 557) is to be coupled to feedback receiver 525. In still other embodiments, output selector control signal 591 may determine which mixer unit (mixer unit 540 or mixer unit 545) receives correction signal 586 from correction module 560.

FIG. 8B shows an illustrative table 850 that describes exemplary modes and configurations for transceiver 500 including input sources for first correction sub-module 603, second correction sub-module 604, and analysis unit 601. Table 850 also shows settings associated with feedback signal selector 551 and output selector 550. Table 850 is not meant as an exhaustive list of all possible operating modes and configurations, but instead shows exemplary mode and configurations for transceiver 500.

Figure 9:
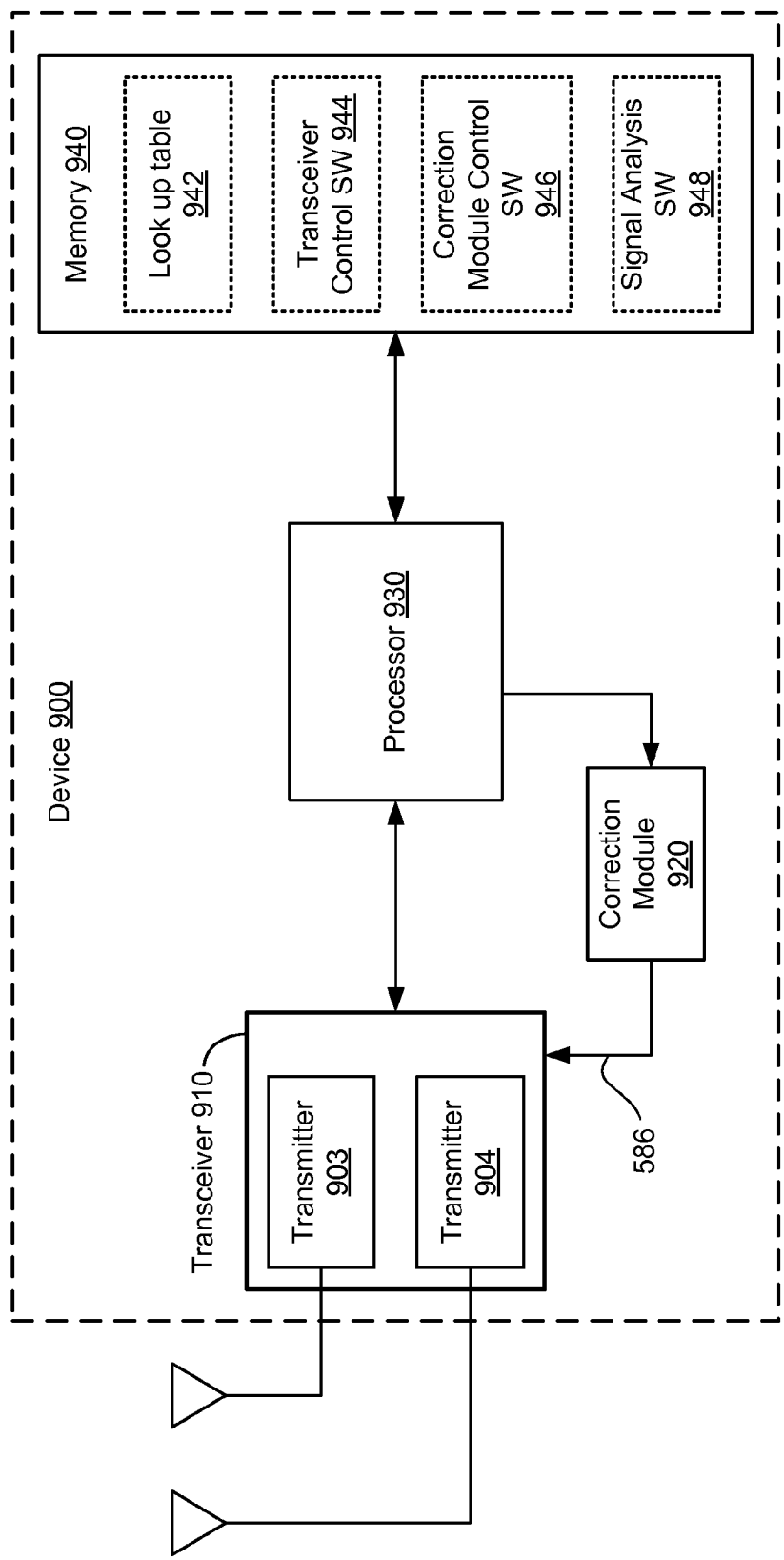
FIG. 9 depicts a device that is another exemplary embodiment of the wireless device of FIG. 2.

FIG. 9 depicts a device 900 that is another exemplary embodiment of wireless device 110 of FIG. 2. Device 900 includes a transceiver 910, a correction module 920, a processor 930, and a memory 940. In some embodiments, transceiver 910 may be similar to one or more exemplary embodiments of transceiver 400 or transceiver 500 described above in conjunction with FIG. 4 and FIG. 5, respectively. In other embodiments, transceiver 910 may be similar to primary transceiver 220 and/or secondary transceiver 222 described above in conjunction with FIG. 2. In some embodiments, transceiver 910 may be a multi-band transceiver capable of supporting carrier aggregation, which is simultaneous operation on multiple carriers (e.g., carrier frequencies). In one embodiment, transceiver 910 may include a first transmitter 903 and a second transmitter 904 to transmit and receive communication signals through different carrier frequencies.

Correction module 920 may generate a correction signal 586 to correct one or more impairments associated with a transmit communication signal. For example, in one embodiment, correction module 920 may generate correction signal 586 to reduce or attenuate an intermodulation distortion associated with a modulated transmit communication signal. In another embodiment, correction module 920 may generate correction signal 586 to equalize and/or pre-distort a transmit communication signal. Correction module 920 may include one or more correction sub-modules, such as first correction sub-module 603 and/or second correction sub-module 604 (see FIG. 6A).

Memory 940 may include a look up table 942 that may be used to store one or more sub-module settings for correction module 920. In one embodiment, sub-module settings associated with pre-distorting a transmit communication signal may be stored within look up table 942. In another embodiment, sub-module settings associated with equalizing a transmit communication signal may be stored within look up table 942.

Memory 940 may also include a non-transitory computer-readable storage medium (e.g., one or more nonvolatile memory elements, such as EPROM, EEPROM, Flash memory, a hard drive, etc.) that may store the following software modules:
- transceiver control software 944 to select frequency bands within which to operate transceiver 910;
- correction module control software 946 to determine operating modes for correction module 920; and
- signal analysis software 948 to analyze a communication signal and determine one or more settings for correction sub-modules included within correction module 920.

Each software module includes program instructions that, when executed by processor 930, may cause the device 900 to perform the corresponding function(s). Thus, the non-transitory computer-readable storage medium of memory 940 may include instructions for performing all or a portion of the operations of FIG. 10.

Processor 930, which is coupled to transceiver 910, correction module 920, and memory 940, may be any one or more suitable processors capable of executing scripts or instructions of one or more software programs stored in device 900 (e.g., within memory 940).

Processor 930 may execute transceiver control software 944 to select one or more frequency bands within which to operate transceiver 910. For example, transceiver control software 944 may select a 2.4 GHz frequency band to operate transmitter 903 and may select a 900 MHz frequency band to operate transmitter 904. In other embodiments, transceiver 910 may operate within other frequency bands.

Processor 930 may execute correction module control software 946 to determine operating modes for correction module 920. For example, correction module control software 946 may operate correction module 920 in a first operating mode to reduce intermodulation distortion within a first transmit communication signal. In another example, correction module control software 946 may operate correction module 920 in a fifth operating mode to equalize a first transmit communication signal. The operating modes listed herein are merely exemplary and are not meant to be limiting.

Processor 930 may execute signal analysis software 948 to analyze a communication signal and determine one or more sub-module settings for first correction sub-module 603 and/or second correction sub-module 604 based on the communication signal. In some embodiments, signal analysis software 948 may analyze an aggressor signal and determine sub-module settings to generate a correction signal 586 to reduce or attenuate the effects of the aggressor signal on the victim signal. In other embodiments, signal analysis software 948 may analyze a communication signal and determine sub-module settings to generate a correction signal 586 to equalize and/or pre-distort the communication signal.

Figure 10:
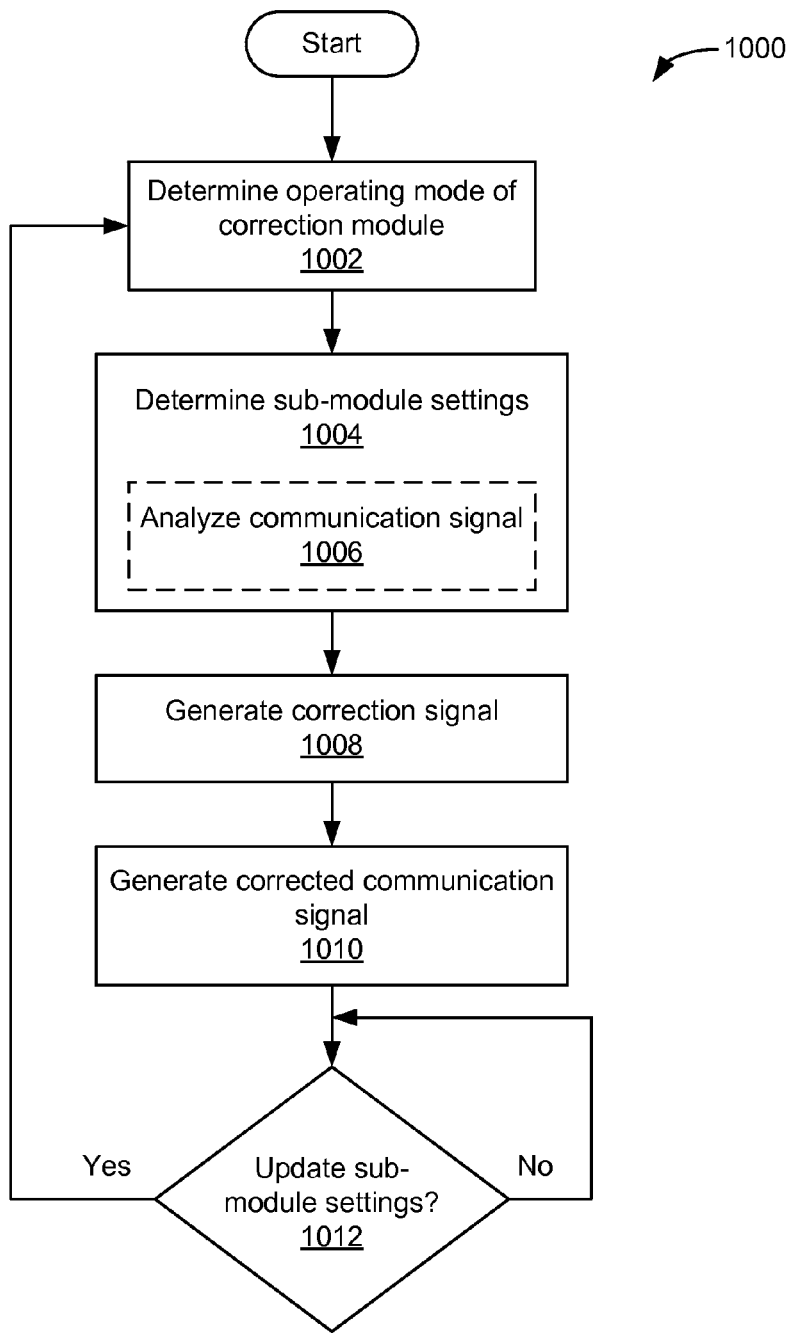
FIG. 10 shows an illustrative flow chart depicting an exemplary operation for the wireless device of FIG. 1, in accordance with some embodiments.

FIG. 10 shows an illustrative flow chart depicting an exemplary operation 1000 for wireless device 110, in accordance with some embodiments. Referring also to FIGS. 5, 6, 8, and 9, an operating mode of correction module 560 is determined (1002). In some embodiments, the operating mode may be based on a desired correction signal 586. For example, the operating mode may be determined, at least in part, by correction signal 586 to reduce or attenuate an intermodulation distortion associated with a first communication signal, to equalize the first communication signal, and/or to pre-distort the first communication signal. Additionally, in some embodiments, the operating mode may also be determined by the aggressor signal and the victim signal.

Next, sub-module settings are determined based on the operating mode (1004). For example, the operating mode of correction module 560 may be selected to pre-distort the first communication signal. Thus, the sub-module settings for pre-distorting the first communication signal may be retrieved from look up table 942 and used to configure correction module 560 to perform the pre-distortion of the first communication signal. In other examples, other sub-module settings may be determined based on other operating modes.

In some embodiments, determining sub-module settings 1004 may also include an optional analysis of a communication signal (1006). The analysis of the communication signal may aid in the determining of the sub-module settings. For example, if the operating mode of correction module 560 is to generate correction signal 586 to reduce or attenuate intermodulation distortion due to the aggressor signal, then the aggressor signal may be analyzed by analysis unit 601. In another example, if the operating mode of correction module 560 is to generate a correction signal 586 to equalize the first communication signal, then the first communication signal may be analyzed by analysis unit 601. In other examples, other signals may be analyzed by analysis unit 601.

Next, correction signal 586 is generated (1008). In some embodiments, correction signal 586 may be generated by one or more correction sub-modules 603-604 configured by sub-module settings determined at 1004. Next, a corrected communication signal is generated (1010). In some embodiments, the corrected communication signal may be generated by summing a communication signal with correction signal 586.

Next, an update of the sub-module settings is determined (1012). If sub-modules settings are to be updated, then operations proceed to 1002. If sub-module settings are not to be changed, then operations proceed to 1012 to continue to check if sub-module settings are to be updated.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media.

In the foregoing specification, the present embodiments have been described with reference to specific exemplary embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. An apparatus comprising:
   a first correction sub-module configured to generate a first portion of a correction signal to modify a first transmit communication signal based at least in part on an operating mode of the apparatus;
   a control block configured to generate a mode control signal; and
   an analysis unit configured to determine sub-module settings to control the first correction sub-module based at least in part on a second transmit communication signal and the mode control signal.

2. The apparatus of claim 1, wherein the first transmit communication signal is a digital baseband signal for a first transmitter, and the second transmit communication signal is a digital baseband signal for a second transmitter.

3. The apparatus of claim 1, further comprising:
   an input selector configured to select the second transmit communication signal from a plurality of communication signals.

4. The apparatus of claim 1, wherein the correction signal is configured to attenuate an intermodulation distortion associated with the first transmit communication signal and wherein the correction signal is based on at least one signal from the group consisting of a digital baseband signal for a first transmitter, a digital baseband signal for a second transmitter, a digital baseband signal from a first receiver, and a digital baseband signal from a second receiver.

5. The apparatus of claim 1, wherein the correction signal is configured to equalize the first transmit communication signal and wherein the correction signal is based on at least one signal from the group consisting of a digital baseband signal for a first transmitter and a digital baseband signal for a second transmitter.

6. The apparatus of claim 1, wherein the correction signal is configured to pre-distort the first transmit communication signal and wherein the correction signal is based on at least one signal from the group consisting of a digital baseband signal for a first transmitter and a digital baseband signal for a second transmitter.

7. The apparatus of claim 1, further comprising:
   a second correction sub-module configured to generate a second portion of the correction signal to modify the first transmit communication signal.

8. The apparatus of claim 1, wherein the first correction sub-module is further configured to:
   modify a phase associated with the second transmit communication signal;
   modify a time associated with the second transmit communication signal; and
   modify an amplitude associated with the second transmit communication signal.

9. The apparatus of claim 1, wherein the analysis unit is configured to determine module settings for the first correction sub-module based on an operating mode of the apparatus.

10. The apparatus of claim 1, wherein the analysis unit is further configured to determine initial correction sub-module settings based on analyzing the second transmit communication signal.

11. The apparatus of claim 1, wherein the first correction sub-module is configured to perform at least one operation selected from the group consisting of intermodulation cancellation, equalization of a digital transmit signal, and pre-distortion of a digital transmit signal based at least in part on the mode control signal.

12. The apparatus of claim 1, wherein the mode control signal is based on at least one signal selected from the group consisting of an aggressor signal and a victim signal.

13. An apparatus comprising:
   means for generating a first portion of a correction signal to modify a first transmit communication signal via a first correction sub-module based at least in part on an operating mode of the apparatus;
   means for generating a mode control signal; and
   means for determining sub-module settings to control the first correction sub-module based at least in part on a second transmit communication signal and the mode control signal.

14. The apparatus of claim 13, wherein the first transmit communication signal is a digital baseband signal for a first transmitter, and the second transmit communication signal is a digital baseband signal for a second transmitter.

15. The apparatus of claim 13, further comprising:
   means for selecting the second transmit communication signal from a plurality of communication signals.

16. The apparatus of claim 13, wherein the correction signal is configured to attenuate an intermodulation distortion associated with the first transmit communication signal and wherein the correction signal is based on at least one signal from the group consisting of a digital baseband signal for a first transmitter, a digital baseband signal for a second transmitter, a digital baseband signal from a first receiver, and a digital baseband signal from a second receiver.

17. The apparatus of claim 13, wherein the correction signal is configured to equalize the first transmit communication signal and wherein the correction signal is based on at least one signal from the group consisting of a digital baseband signal for a first transmitter and a digital baseband signal for a second transmitter.

18. The apparatus of claim 13, wherein the correction signal is configured to pre-distort the first transmit communication signal and wherein the correction signal is based on at least one signal from the group consisting of a digital baseband signal for a first transmitter and a digital baseband signal for a second transmitter.

19. The apparatus of claim 13, wherein the first portion of the correction signal is based on an operating mode of the apparatus.

20. A non-transitory computer-readable medium storing instructions that, when executed by a processor of an apparatus causes the apparatus to:
generate, by a first correction sub-module, a first portion of a correction signal to modify a first transmit communication signal based at least in part on an operating mode of the apparatus;
generate, by a control block, a mode control signal; and
determine, by an analysis unit, sub-module setting to control the first correction sub-module based at least in part on a second transmit communication signal and on the mode control signal.

\* \* \* \* \*